United States Patent
Choi et al.

(10) Patent No.: US 10,523,692 B2
(45) Date of Patent: Dec. 31, 2019

(54) LOAD BALANCING METHOD AND APPARATUS IN INTRUSION DETECTION SYSTEM

(71) Applicants: SAMSUNG ELECTRONICS CO., LTD., Suwon-si, Gyeonggi-do (KR); SEOUL NATIONAL UNIVERSITY R&DB FOUNDATION, Seoul (KR)

(72) Inventors: Yoon-Ho Choi, Busan (KR); Seung-Woo Seo, Seoul (KR); Bon-Hyun Koo, Suwon-si (KR); Hye-Jung Cho, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 172 days.

(21) Appl. No.: 15/481,763

(22) Filed: Apr. 7, 2017

(65) Prior Publication Data
US 2017/0295191 A1 Oct. 12, 2017

(30) Foreign Application Priority Data

Apr. 8, 2016 (KR) .................. 10-2016-0043609
Apr. 4, 2017 (KR) .................. 10-2017-0043832

(51) Int. Cl.
| | | |
|---|---|---|
| H04L 29/06 | (2006.01) | |
| G06F 21/55 | (2013.01) | |
| G06F 21/56 | (2013.01) | |

(52) U.S. Cl.
CPC ......... *H04L 63/1416* (2013.01); *G06F 21/55* (2013.01); *G06F 21/564* (2013.01); *H04L 63/0245* (2013.01); *H04L 63/1441* (2013.01)

(58) Field of Classification Search
CPC ................ H04L 63/0245; H04L 63/1416
See application file for complete search history.

(56) References Cited

U.S. PATENT DOCUMENTS 6,954,775 B1 * 10/2005 Shanklin ............. H04L 63/1416
                                                        713/168
7,418,732 B2 * 8/2008 Campbell ............. G06F 21/562
                                                        726/23
(Continued)

FOREIGN PATENT DOCUMENTS

| KR | 10-0648297 | 11/2006 |
| KR | 10-0959244 | 5/2010 |
| KR | 10-1382787 | 4/2014 |

OTHER PUBLICATIONS

Li, Yunchun; Qiao, Xinxin; "A Parallel Packet Processing Method on Multi-Core Systems", 10th International Symposium on Distributed Computing and Applications to Business, Engineering and Science, IEEE, Oct. 14-17, 2011, pp. 78-81.*

(Continued)

*Primary Examiner* — Victor Lesniewski
(74) *Attorney, Agent, or Firm* — Nixon & Vanderhye P.C.

(57) ABSTRACT

A method of load balancing by multiple cores in a multi-core-based load balancing apparatus comparing arriving packets with a signature is provided, and comprises first load-balancing first packets arriving on the multiple cores during a first period based on an arrival rate of the first packets, identifying a signature for the comparison, analyzing the first packets, determining at least one service type of the first packets, estimating a mean deep packet inspection (DPI) time corresponding to the determined at least one service type of the first packets, generating a load balancing rule using the estimated average DPI time, and second load-balancing second packets arriving on the multiple cores during a second period using the generated load balancing rule.

16 Claims, 10 Drawing Sheets

(56) References Cited

U.S. PATENT DOCUMENTS

| | | | |
|---|---|---|---|
| 7,808,897 B1* | 10/2010 | Mehta | H04L 43/00 370/230 |
| 7,817,549 B1* | 10/2010 | Kasralikar | H04L 63/1408 370/232 |
| 8,108,387 B2 | 1/2012 | Choi et al. | |
| 8,756,337 B1* | 6/2014 | Canion | H04L 63/145 370/237 |
| 9,686,296 B1* | 6/2017 | Murchison | H04L 41/06 |
| 2007/0006293 A1* | 1/2007 | Balakrishnan | H04L 63/0245 726/13 |
| 2007/0061433 A1* | 3/2007 | Reynolds | H04L 41/0806 709/223 |
| 2008/0316923 A1* | 12/2008 | Fedders | H04L 67/2823 370/230 |
| 2010/0172257 A1* | 7/2010 | Yu | H04L 63/0245 370/252 |
| 2011/0066631 A1 | 3/2011 | Choi et al. | |
| 2011/0231924 A1* | 9/2011 | Devdhar | H04L 63/0236 726/11 |
| 2012/0041965 A1* | 2/2012 | Vasquez | H04L 43/028 707/758 |
| 2014/0160927 A1* | 6/2014 | Majumdar | H04L 47/10 370/235 |
| 2014/0169367 A1* | 6/2014 | Tsym | H04L 45/74 370/392 |
| 2014/0173094 A1* | 6/2014 | Majumdar | H04L 43/028 709/224 |
| 2014/0215621 A1* | 7/2014 | Xaypanya | H04L 63/145 726/23 |
| 2014/0254368 A1* | 9/2014 | Zhang | H04L 47/2441 370/235 |
| 2015/0304202 A1* | 10/2015 | Majumdar | H04L 43/50 709/224 |
| 2016/0085577 A1* | 3/2016 | Gray | G06F 9/45558 718/1 |
| 2016/0191558 A1* | 6/2016 | Davison | H04L 63/145 713/171 |
| 2016/0323302 A1* | 11/2016 | Teixeira | H04L 63/1416 |
| 2017/0250953 A1* | 8/2017 | Jain | H04L 63/0254 |
| 2017/0250954 A1* | 8/2017 | Jain | H04L 63/0254 |

OTHER PUBLICATIONS

Kamiyama, Noriaki; Mori, Tatsuya; Kawahara, Ryoichi; "Autonomic Load Balancing for Flow Monitoring", International Conference on Communications (ICC), IEEE, Jun. 10-15, 2012, pp. 2684-2688.*

* cited by examiner

LOAD BALANCING METHOD AND APPARATUS IN INTRUSION DETECTION SYSTEM

CROSS-REFERENCE TO RELATED APPLICATION(S)

This application is based on and claims priority under 35 U.S.C. § 119 to a Korean patent application filed in the Korean Intellectual Property Office on Apr. 8, 2016 and assigned Serial No. 10-2016-0043609, and to a Korean patent application filed in the Korean Intellectual Property Office on Apr. 4, 2017 and assigned Serial No. 10-2017-0043832, the disclosures of which are incorporated by reference herein in their entireties.

TECHNICAL FIELD

The present disclosure relates generally to load balancing methods and apparatuses in intrusion detection systems, and for example, multi-core load balancing methods and apparatuses in multi-core-based intrusion detection systems that compare signatures with arriving packets.

DISCUSSION OF RELATED ART

Recently, there are increasing exploits, distribute denial-of-service (DDoS) attacks, and other hacking attempts for outsiders to intrude on network systems. Intrusion detection system (IDS)-related technologies are also advancing to prevent such hacking.

Intrusion detection systems (IDS) may be classified according to some criteria. For example, the systems may be divided into host-based IDSs (HIDSs) and network-based IDSs (NIDSs) depending on where data is gathered and into misuse detection systems and anomaly-based IDSs depending on how intrusion is detected.

The HIDS may enable a host to analyze modifications to system calls, application logs, or file system and the operation and status of the host, identifying an intrusion. The NIDS may check network traffic and monitor several hosts to detect an intrusion. The NIDS may approach network traffic by connection to a preset hub or network switch using a network tap or port mirroring. The hybrid IDS has recently been developed which combines the respective merits of the HIDS and the NIDS.

The misuse detection system is called a signature-based IDS. The misuse detection system may identify an intrusion by monitoring the pattern of arriving packets that are estimated as a misuse. The arriving packets may be traffic or application data. The pattern of the arriving packets is called a rule or signature. The misuse detection system generates a rule set or collection of signatures using the rule or signature. The generated signature collection is stored in a database. The intrusion of malicious packets is detected using the stored signature collection.

The anomaly-based IDS stores the history of access to the system instead of signature information, statistically analyzes the stored access history, and determines that such access as to be estimated as being different from normal one is a malicious intrusion. Such IDSs are advantageous in that they may respond to new types of attacks but may suffer from a low quality of intrusion detection. Artificial intelligence (AI) techniques that are recently growing have led to advancements in anomaly-based IDSs. However, the signature-based IDS is still widely in use which presents rapid and accurate intrusion detection capability.

Typically, the network-based IDS (NIDS) adopts signature-based intrusion detection technology. Intrusion detection systems, by their nature, are required to sequentially inspect all the traffic generated in the network, thus consisting of high-cost, high-specification units. Particularly, NIDS equipped with a CPU including multiple core processors may be employed given that the capability of central processing unit (CPU) has a significant influence on the quality of intrusion detection. Such multi-core processor CPU-equipped NIDS is termed a multi-core NIDS. Since intrusion detection operations are performed on each core processor of the CPU, each core processor is referred to as a node of the multi-core NIDS.

An uneven distribution of operation times to the nodes of the multi-core NIDS may affect the available processing capability of the NIDS. When a longer operation time is assigned to a particular core while a shorter operation time is assigned to another is referred to as 'load is concentrated on the core assigned with the longer operation time.' Since the operation time that the particular load-concentrated core consumes—for example, deep packet inspection (DPI) time—becomes a period of operation time for load balancing, the failure to distribute load increases the inefficiency of the IDS.

The above information is presented as background information only to assist with an understanding of the present disclosure.

SUMMARY

A load balancing method for providing a high-speed multi-core NIDS under normal, or even attack-dominant, traffic is provided.

A service time-aware load balancing (STEAL) method to implement high-speed intrusion detection using a regular expression (RegEx)-based signature and receiving increasing network link capacities is also provided.

A method that compares a signature with nodes of a high-capacity multi-core NIDS based on the packet service time is provided, which is represented as the DPI time at the nodes of the multi-core NIDS to dynamically distribute packets of inspection, thereby avoiding an unbalanced operation distribution among the nodes of the multi-core NIDS.

A load balancing method that is operated using multi-core processors to achieve quick intrusion detection considering that the DPI time for processing large traffic may primarily be influenced by the available processing capability of each core is also provided.

According to an example aspect of the present disclosure, a method of load balancing by multiple cores in a multi-core-based load balancing apparatus comparing arriving packets with a signature comprises first load-balancing first packets arriving on the multiple cores during a first period based on an arrival rate of the first packets, identifying a signature for the comparison, analyzing the first packets, determining at least one service type of the first packets, estimating an average deep packet inspection (DPI) time corresponding to the determined at least one service type of the first packets, generating a load balancing rule using the estimated average DPI time, and second load-balancing second packets arriving on the multiple cores during a second period using the generated load balancing rule.

According to another example aspect of the present disclosure, a multi-core-based load balancing apparatus configured to compare arriving packets with a signature comprises a memory storing a program for generating a load balancing rule, wherein the program, when executed, causes a processor to at least: first load-balance first packets arriving on the multiple cores during a first period based on an arrival rate of the first packets, identify a signature for the comparison, analyze the first packets, determine at least one service type of the first packets, estimate an average deep packet inspection (DPI) time corresponding to the determined at least one service type of the first packets, generate a load balancing rule using the estimated average DPI time, and second load-balance second packets arriving on the multiple cores during a second period using the generated load balancing rule.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The foregoing or other aspects, features, and attendant advantages of the present disclosure will be more apparent and readily appreciated from the following detailed description, taken in conjunction with the accompanying drawings, in which like reference numerals refer to like elements, and wherein:

FIGS. 5A, 5B, 5C and 5D are graphs illustrating capability comparisons between a load balancing method according to example embodiments of the present disclosure and a traffic processing method using a many-core Bro, wherein:

FIG. 5A is a graph illustrating a capability comparison between a STEAL method with a many-core Bro under normal traffic, FIG. 5B is a graph illustrating a capability comparison between a STEAL method and a many-core Bro under attack dominant traffic, FIG. 5C is a graph illustrating a capability comparison between a STEAL method and a many-core Bro depending on the number of signatures and traffic circumstances, and FIG. 5D is a graph illustrating a capability comparison between a STEAL method and a many-core Bro under normal traffic depending on the number of CPU cores.

Throughout the drawings, like reference numerals will be understood to refer to like parts, components, and structures.

DETAILED DESCRIPTION

Figure 1:
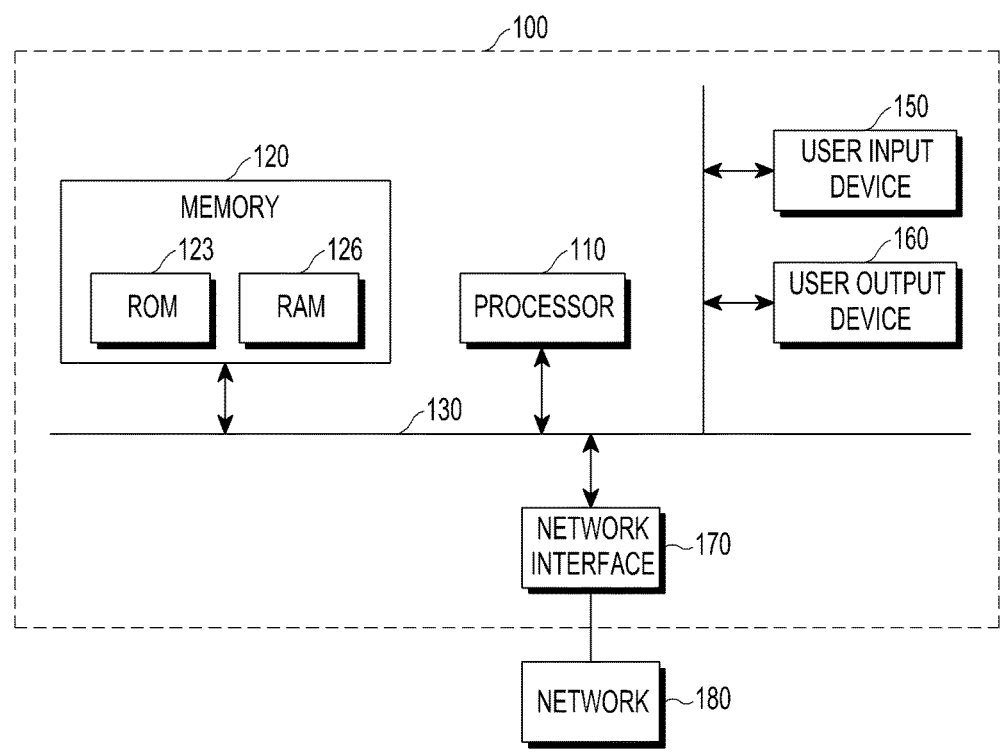
FIG. 1 is a block diagram illustrating an example of a configuration of a computer system on which a traffic processing method is implemented in a communication system according to an example embodiment of the present disclosure.

Hereinafter, various example embodiments of the present disclosure are described in greater detail with reference to the accompanying drawings. Details of known functions or configurations may be omitted where such detail may obscure features of the disclosure. The terms as used herein are defined considering the functions in the present disclosure and may be replaced with other terms according to the intention or practice of the user or operator. Therefore, the terms should be defined based on the overall disclosure.

Before detailing the present disclosure, some terms as used herein are described in an example manner as follows, for example. However, it should be noted that the present disclosure is not limited thereto.

A service time-aware load balancing (STEAL) method may refer, for example, to a method that distributes packet load according to a packet service rate based on a packet service time.

A PF_RING technique may refer to an example of an algorithm that analyzes and load-balances packets. The PF_RING technique may include capturing packets for a predetermined time and analyzing the captured packets to distribute the load of arriving packets.

Bro may refer to an example of NIDS software that may be used in a multi-core NIDS. Bro, provided in an open source, may be combined with the PF_RING technique and STEAL, implementing a signature-based intrusion detection function and load balancing function.

PF_RING or Bro is merely an example and is not intended to limit the scope of the present disclosure. Since the technology applied to PF_RING or Bro, along with what has been set forth herein, may present advantageous effects, what is encompassed by PF_RING or Bro is not excluded from the scope of the present disclosure.

Unless specifically mentioned herein, a many-core Bro may refer, for example, to a load balancing method that combines Bro and PF_RING technique and is used for a multi-core NIDS, and a STEAL method may refer, for example, to a load balancing method that combines Bro, PF_RING, and STEAL altogether.

A packet arrival number may refer, for example, to the total number of packets arriving at a NIDS for a predetermined time. A packet arrival rate may refer, for example, to a rate at which total packets represented by the packet arrival number are distributed to the cores. Typically, the NIDS allows the same number of packets to be distributed to each core. In other words, a method for distributing packets at an even packet arrival rate for each core may, for example, refer to a distribution method according to the packet arrival rate. Typically, packets may sequentially be distributed in an order of arriving packets by round robin scheduling, so that the packets may be distributed to each core according to the packet arrival rate.

A packet service time may refer, for example, to an operation time during which comparison is made between signatures and one or more packets for intrusion detection purposes. Each core compares each of the one or more packets with one or more signatures. The more signatures are present, the longer operation time is consumed. In other words, the packet service time for each packet may be proportional to the number of signatures that are supposed to be compared with the packet. The ratio of the packet service time at one core to the total packet service time for the operation at all the cores, is referred to as a packet service rate.

The intrusion detection capability of a multi-core NIDS is influenced by an unbalanced operation distribution among the nodes of the multi-core NIDS. As compared with packet arrival rate-based load balancing algorithms, which are typically in use, the service time-aware load balancing (STEAL) method adopted for intrusion detection system according to various example embodiments of the present disclosure may increase the number of receive packets that the multi-core NIDS is to process and decrease dropping packets. In particular, STEAL is combined with Bro which is an open source NIDS. Thus, STEAL may quickly detect an intrusion even under attack dominant traffic and a large number of signatures, leading to a rapid enhancement in the capability of the multi-core NIDS.

The signature-based network intrusion detection system (e.g., the misuse detection system or NIDS) has successfully detected various attacks on networks. Further, signature-based NIDSs and relevant schemes are in wide use to quickly detect intrusion packets. However, increasing intrusion packet variations and network link capacity render it difficult to process, in real-time, a large amount of traffic. Issues for implementing a high-speed NIDS may be typically broken down into: i) deep packet inspection (DPI) for high-speed signature matching; and ii) a method for processing in parallel a good deal of traffic.

The signature-based NIDS compares packets with a signature collection, a set of known attack patterns, and may be referred to as deep packet inspection (DPI) because it performs comparison on both the packet header and payload.

The signatures are written in the form of a regular express (RegEx) to represent many various attack patterns.

The DPI time relies primarily on the signature matching time for comparing an arriving packet with a predefined NIDS signature. Because multiple attack patterns may be observed for a certain service, it consists of a plurality of signatures which are called a signature collection. The signature collection may consist of signatures corresponding to an application protocol (e.g., service or port number). For example, signature 1, signature 1, and signature 3 may correspond to port number 8404, signature 4, signature 5, and signature 6 may correspond to port number 9730, and signature 7, signature 8, and signature 9 may correspond to port number 13271. The port number signature numbers are given as an example without limiting the scope of the present disclosure.

A network attacking intrusion program, in its pattern, tends to concentrate on a particular port. Thus, generating a signature collection corresponding to the particular port number is still effective. However, a signature collection is not necessarily required to correspond to a port number. Since a majority of services are allowed to use a user defined port rather than well-known ports, the signature is dependent more on service rather than on port. However, the description of the present disclosure assumes that a particular service is provided using a particular port number for illustration purposes.

A signature for intrusion detection may oftentimes be represented in a regular expression (RegEx) which is called a regular expression-based signature. When an intrusion detection system uses the regular expression, it may easily create a signature with which it may analyze the attack intrusion log and may easily figure out the characteristics of the intrusion. Since the regular expression may work alike on different programming languages, the regular expression-based signature may be compatible among different intrusion detection systems. The compatibility of signature allows for easier establishment of an intrusion detection signature. A signature for a new attack pattern may easily be created using the regular expression.

There are nowadays vigorous research efforts to develop rapid DPI algorithms to detect intrusions using the regular expression-based signature. The rapid DPI algorithms for intrusion detection are implemented primarily on multi-core NIDSs.

Where a rapid DP algorithm is implemented on a single-core NIDS, the DPI time that the single-core NIDS may assign for inspection is limited by the available processing capability of the single-core NIDS. The limited DPI time may restrict the number of packets that the NIDS may inspect in real-time. The operation of a multi-core NIDS might partially address the limitations due to the single core. The multi-core NIDS may increase the number of packets that are to be inspected in real-time as compared with the single-core NIDS. A node of the multi-core NIDS may refer, for example, to one core processor of multiple core processors.

The available processing capability of the multi-core NIDS may be measured by the amount of load processed by the nodes of the multi-core NIDS and relies on the packet service rate (rate in packet service time) and packet arrival rate. The packet service time may be specified by the DPI time.

Where the multi-core NIDS has a fixed number of nodes, if the packet arrival rate for each core increases in condition of the fixed packet service time, the available processing capability of the multi-core NIDS reduces. However, if the packet service time for each core reduces in condition of the fixed packet arrival rate, the available processing capability of the multi-core NIDS may increase. In other words, if the packet service time for each core decreases, the number of packets that the multi-core NIDS inspects may increase. Hence, a method for reducing the packet service time for each core is critical to enhance the DPI for processing a large amount of traffic.

The available processing capability of the multi-core NIDS is influenced by an imbalance in operation distribution that exists among the nodes of the multi-core NIDS. In particular, the packet arrival rate-based load balancing method induces a longer DPI time in the multi-core NIDS. However, if the packet processing time for the nodes in the multi-core NIDS may be evenly distributed, the DPI time of the multi-core NIDS may be minimized, and the processing capability (per-time traffic processing capability) of the multi-core NIDS may be maximized. In other words, the intrusion detection time for a determined amount of traffic may be minimized.

FIG. 1 is a block diagram illustrating an example of a configuration of a computer system on which a load balancing method is implemented in an intrusion detection system according to an example embodiment of the present disclosure.

Meanwhile, the load balancing method in the intrusion detection system according to an example embodiment of the present disclosure may be implemented on the computer system 100 or recorded in a recording medium. Referring to FIG. 1, the computer system 100 may include at least one or more processors (e.g., including processing circuitry) 110 and a memory 120.

The processor 110 may include various processing circuitry, such as, for example, and without limitation, a central processing unit (CPU) or a semiconductor device processing commands stored in the memory 120.

The processor 110 may be a controller comprising processing circuitry controlling all the operations of the computer system 100. The controller may run operations of the computer system 100 by reading and running program codes stored in the memory 120.

The computer system 100 may further include at least one of a user input device (e.g., including input circuitry) 150, a data communication bus 130, and a user output device (e.g., including output circuitry) 160. The above-described components may perform data communication through the data communication bus 130.

The computer system 100 may further include a network interface (e.g., including network interface circuitry) 170 connected to the network 180. The network interface 170 may be implemented by a transceiver.

The memory 120 may include various types of volatile or non-volatile storage media. For example, the memory 120 may include a read only memory 123 and a random access memory 126.

Accordingly, the load balancing method in the intrusion detection system may be implemented in such a manner as to be able to run on a computer, according to an example embodiment of the present disclosure. According to an embodiment of the present disclosure, when the load balancing method in the intrusion detection system is performed on a computer device, computer readable commands may perform the operation method according to the present disclosure.

Meanwhile, the load balancing method in the intrusion detection system may be implemented in codes that a computer may read out of a recording medium, according to an embodiment of the present disclosure. The computer-readable recording medium includes all types of recording media storing data that can be read out or interpreted by the computer system 100. For example, the computer-readable recording medium may include a ROM, a RAM, a magnetic tape, a magnetic disc, a flash memory, and an optical data storage device. Further, the computer-readable recording medium may be distributed on the computer system 100 connected via the computer communication network and may be stored and run as codes readable in a distributive manner.

Figure 2A:
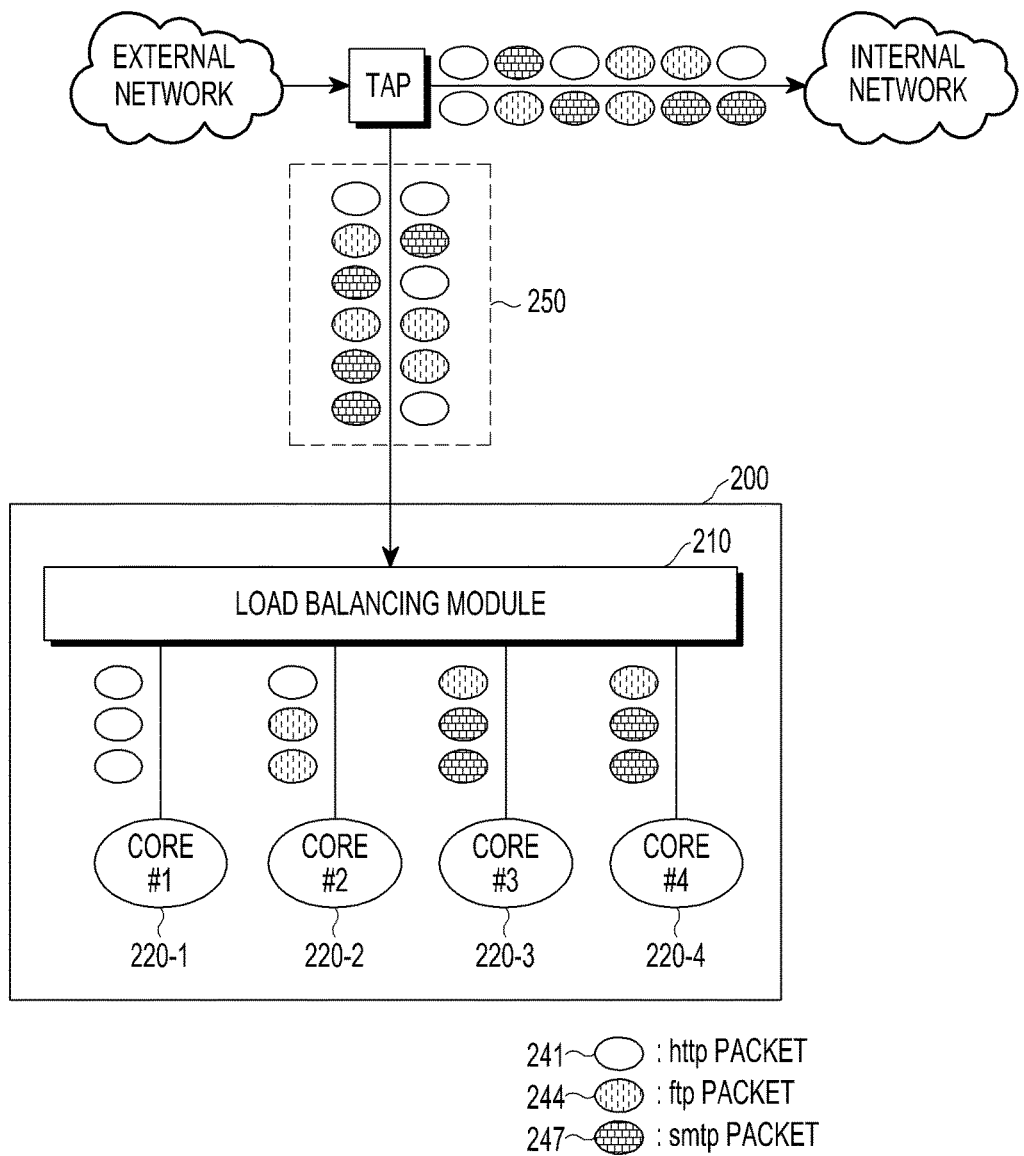
FIGS. 2A and 2B are diagrams illustrating an example load balancing method for a multi-core NIDS.
Figure 2B:
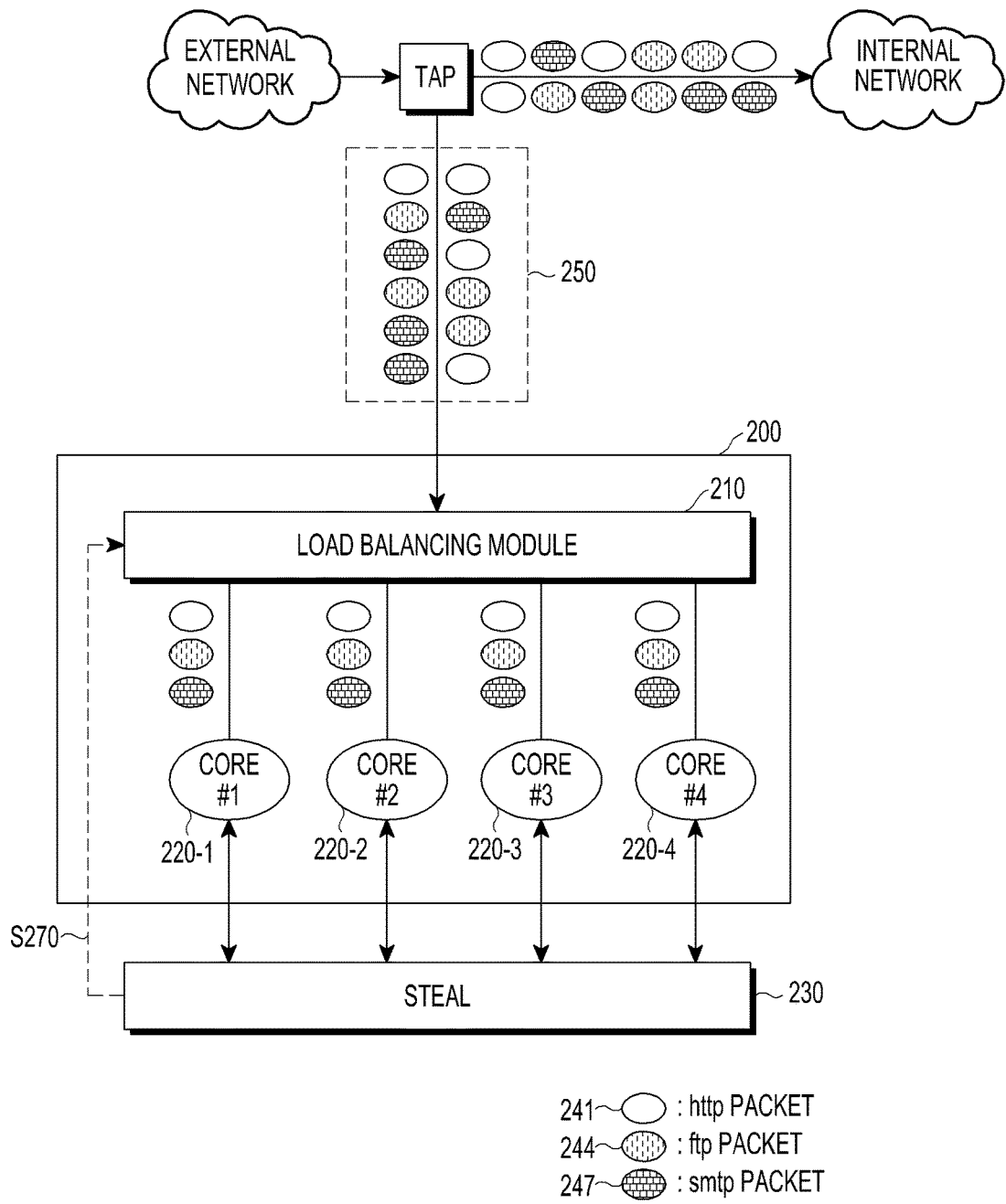

FIGS. 2A and 2B are diagrams illustrating an example load balancing method for a multi-core NIDS. FIG. 2A illustrates a load balancing method according to a packet arrival rate, and FIG. 2B illustrates a load balancing method according to a packet service time.

Referring to FIGS. 2A and 2B, each incoming packet 250 to a NIDS 200 may refer, for example, to any one of a hypertext transfer protocol (http) packet 241, a file transfer packet (ftp) packet 244, and a simple mail transfer protocol (SMTP) packet 247. The dotted line S270 in FIG. 2B indicates that the load balancing method according to the present disclosure is applied so that a new load balancing rule is updated.

As illustrated in FIGS. 2A and 2B, 12 packets 250, in total, are coming into the NIDS 200 during one period, including four http packets 241, four ftp packets 244, and four smtp packets 247. The multi-core NIDS includes, for example, four cores. The nodes of the multi-core NIDS are operated on the four cores 220-1, 220-2, 220-3, and 220-4. The numbers of the packets and cores are an example and do not limit the scope of the present disclosure.

The number of signatures may be varied depending on the type of packets. For example, it is assumed that the total number of signatures is 100 of which 50 signatures are for the http packets 241, 40 signatures are for the ftp packets 244, and 20 signatures are for the smtp packets 247. The ratios between the signatures and the http packets 241, between the signatures and the ftp packets 244, and between the signatures and the smtp packets 247 may be 0.5, 0.3, and 0.2, respectively. For a single packet, all of the signatures corresponding to the type of the packets should be inspected. Thus, the DPI time for the single packet relies on the type of the single packet and the ratio of the signatures to the packet. It is assumed that the average DPI times for the http packets 241, ftp packets 244, and smtp packets 247 are 5 μs, 3 μs, and 2 μs, respectively, according to the signature ratio depending on the type of packets.

Referring to FIG. 2A, three of the twelve packets in total are distributed to each core according to the packet arrival rate. Since the sum of the DPI times for operation at all the cores is 40 μs(=5 μs*4+3 μs*4+2 μs*4), if the DPI time assigned to each core is evenly distributed, the DPI time assigned to each core may become 10 μs. However, in the case illustrated in FIG. 2A, the load balancing module (e.g., which may include various circuitry and/or program elements) 210 distributes the arriving packets 250 according to the packet arrival rate. In other words, the packets are sequentially distributed to the nodes of the multi-core NIDS in order of their arrival by round robin scheduling, causing an imbalance in operation distribution among the cores. In FIG. 2A, the node with the longest DPI time (15 μs), among the nodes of the multi-core NIDS, is core#1 220-1. That is, the DPI time of the multi-core NIDS relies on the longest DPI time (core #1), core#1 220-1 receives three http packets, and the DPI time of a single http packet is 5 μs, resulting in the DPI time of core #1 220-1 being 15 μs. By calculation likewise, the DPI time of core #2 220-2 becomes 11 μs, the DPI time of core#3 220-3 becomes 7 μs, and the DPI time of core#4 220-4 becomes 7 μs. Since the DPI time of the multi-core NIDS in the corresponding period is influenced by the longest DPI time, the DPI time of the multi-core NIDS in the case illustrated in FIG. 2A becomes 15 μs.

On the other hand, FIG. 2B illustrates an example in which packets are distributed to each core based on the packet service time. Since the DPI time consumed at each core is the same, e.g., 10 μs, the DPI time of the multi-core NIDS becomes 10 μs. That is, load balancing using the packet service time may avoid an imbalance in the operation distribution among the nodes of the multi-core NIDS while minimizing and/or reducing the DPI time of the multi-core NIDS. The load balancing method illustrated in FIG. 2B is implemented based on the packet service time and is thus called a service time-aware load balancing (STEAL) method.

Implementing a STEAL method uses the DPI time of multi-core NIDS being influenced by the relationship between traffic and signature. The relationship between traffic and signature is analyzed using the estimated packet service time.

The DPI time of a single packet is determined by the number of signatures corresponding to the packet. Typically, as the number of signatures corresponding to the single packet increases, the DPI time increases while the number of signatures decreases, the DPI time decreases.

However, the DPI time does not rely only on the number of signatures. The DPI time may be influenced by the type of packet or the state or structure of network.

Accordingly, the load balancing apparatus estimates an average DPI time of the packet considering the influence by the signatures according to traffic using a given signature collection. The estimated average DPI time is used to figure out the optimal load balancing rule that maximizes and/or increases the number of packets that the multi-core NIDS processes on the multi-core processors.

The signature collection rarely varies during intrusion detection. The signature collection is varied in cases where the signature collection is periodically updated. However, the traffic itself may be significantly varied while in service, and the load balancing rule needs to be varied by the relationship between signature and traffic. Here, the traffic is determined by a set of arriving packets and is typically represented in a per-time data size (e.g., kB/sec or MB/sec). If the number of arriving packets increases, the traffic increases as well. However, the data size of a single packet may not be even.

According to the present disclosure, there is proposed a service time-aware load balancing algorithm (STEAL) 230 for rapid intrusion detection given the influence on the multi-core NIDS by traffic and signatures. STEAL 230 according to the present disclosure, as compared with packet arrival rate-based load balancing methods typically being used, may increase the number of packets and decrease the number of dropping packets. The traffic processing method according to the present disclosure is a first approach to estimate an average DPI time considering both traffic and signatures in order to maximize the total number of packets that a multi-core NIDS processes.

The STEAL method has been designed to perform load balancing on nodes of a multi-core NIDS where software runs on multi-core processors.

Software-based load balancing algorithms for rapid intrusion detection are described below.

A static load balancing algorithm has been proposed that distributes packets over software-based NIDS nodes on the basis of flow characteristics. Round robin scheduling is adopted for processing data in parallel on a server platform having two Intel dual-core Xeon processors, and the flow static hash (FSH) is used for load sharing between packet processing threads. Static hashing schemes for analyzing network and transport layer header fields determine NIDS nodes for packet forwarding.

There has also been proposed a load balancing scheme for a particular environment where the available operation capability cannot deal with input data speed using a priority model.

Rule collection partitioning balancing (RPB) has also been proposed that partitions a NIDS rule collection (i.e., signature), not traffic.

The dynamic flow-based load balancing algorithm has been designed using a graphic processing unit (GPU). The GPU shows a much higher performance in simple parallel processing than the CPU. However, the GPU might not be appropriate for the multi-core NIDS because it exhibits a poor performance when running serial processing functions that are performed at a number of branches.

Another dynamic flow-based load balancing scheme proposed is one for allowing the load balancing algorithm to address the issue that captures packets are dropped over a high data rate network using the in-kernel large ring buffer pools for accommodating captured packets. For dynamic arrangement of input traffic with available sensors, a dynamic load balancing algorithm is proposed that may dynamically reassign a connected made to any sensor. A hybrid parallel structure has also been proposed that combines parallel processing of data and pipeline in order to utilize multi-core operation capability in the multi-core NIDS. However, the adaptive flow-based load balancing scheme based on the traffic arrival rate may not address the load imbalance issue because flows exhibit a significant imbalance and the DPI time is diversified depending on the relationship between traffic and signature.

In order to address the above-mentioned technical issues, the load balancing method according to the present disclosure provides a method for estimating an average DPI time considering the influence by both traffic and signatures.

Figure 3:
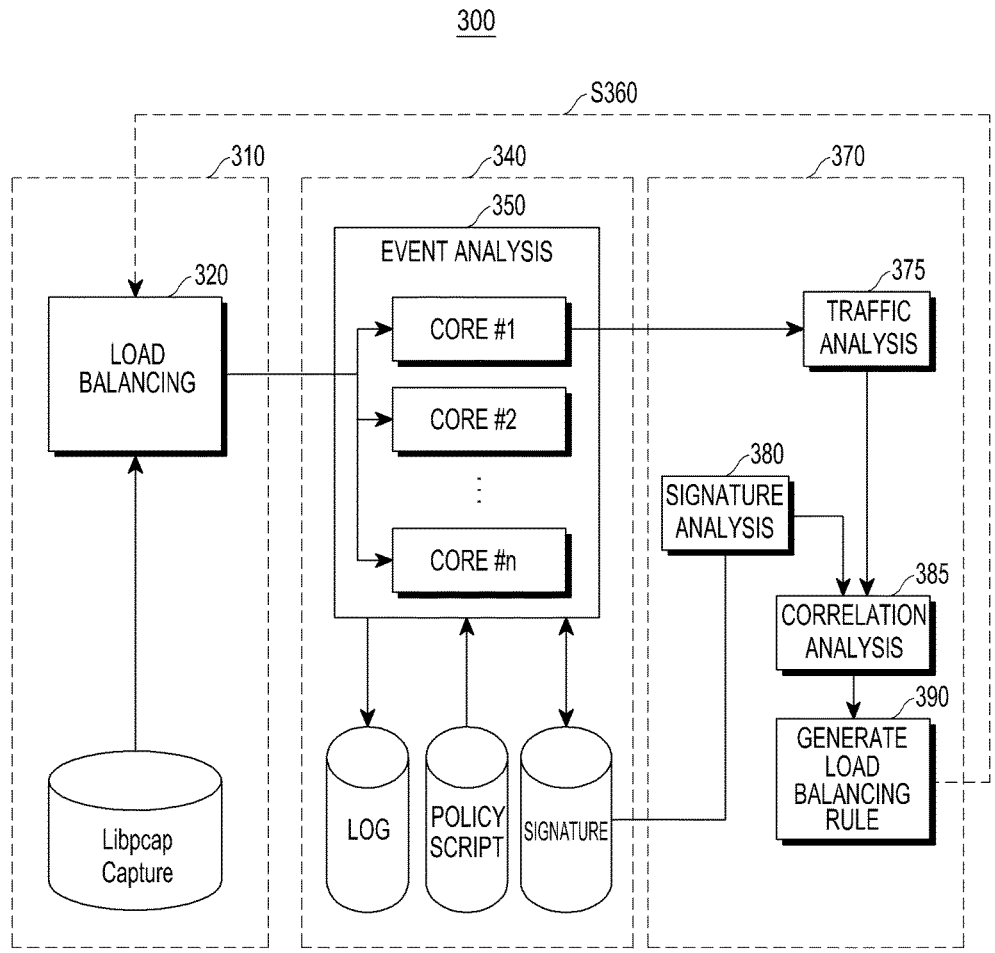
FIG. 3 is a block diagram illustrating example functions of a multi-core NIDS.

FIG. 3 is a block diagram illustrating an example NIDS according to an example embodiment of the present disclosure.

The network intrusion detection system (NIDS) may also be referred to as an intrusion detection system or load balancing apparatus 300 according to the present disclosure. According to the present disclosure, the load balancing apparatus 300 is typically part of a NIDS but the present disclosure is not limited thereto. The term "load balancing apparatus" may interchangeably be used with the term "intrusion detection system" in some cases.

According to the present disclosure, the load balancing apparatus 300 includes a load balancing module (e.g., including load balancing circuitry and/or program elements) 310, an event analyzing module (e.g., including event analyzing circuitry and/or program elements) 340, and a load balancing rule generating module (e.g., including load balancing rule generating circuitry and/or program elements) 370.

In the intrusion detection system, the load balancing apparatus 300 may include a memory storing a program for providing the load balancing module 310, the event analyzing module 340, and the load balancing rule generating module 370, and a processor for running the program.

The load balancing module 310 may include at least one of a load balancing component 320 and a packet capturing component.

The load balancing module 310 may capture incoming packets and distribute the captured packets to each core of the CPU. For example, the load balancing module 310 may capture the incoming packets using a libpcap library.

Typically, the load balancing module 310 assigns the incoming packets to multiple cores depending on a load balancing rule. For example, individual packets may be distributed to each node of the multi-core NIDS by a round robin scheduling method.

According to the present disclosure, the load balancing apparatus 300 dynamically updates the load balancing rule (S360). In order for the load balancing rule generating module 370 to generate a new load balancing rule, the load balancing module 310 needs to capture packets coming in for a predetermined period. Further, the captured packets may be distributed to each node of the multi-core NIDS depending on the new load balancing rule generated.

The event analyzing module 340 may include at least one of an event analyzing component 350, a log database (DB), an intrusion detection policy script DB, and a signature collection.

The event analyzing module 340 compares a captured packet with a signature as per an intrusion detection policy in any one of the nodes of the multi-core NIDS, and upon discovering packet payload matching one or more signatures, identifies that the packet is a malicious packet.

When the incoming packets are inspected by each node of the multi-core NIDS, the event analyzing module 340 multi-core NIDS generates metadata for all the incoming packets. The metadata includes transmission header information and network header information. The metadata for all the packets is sent to the load balancing rule generating module 370.

The load balancing rule generating module 370 includes at least one of a traffic analyzing component 375, a signature analyzing component 380, a correlation analyzing component 385, and a load balancing rule generating component 390.

The traffic analyzing component 375 calculates (determines) the number of packets having the same port number and transmits packet information per port number calculated to the correlation analyzing component 385. The correlation analyzing component 385 estimates an average DPI time for the port number considering the influence by the signature collection corresponding to the same port number. The load balancing rule generating component 390 generates a customized load balancing rule for each core using the average DPI time estimated per port number and performs load balancing on each core according to the generated load balancing rule.

Hereinafter, the service time-aware load balancing method is described in detail.

Table 1 below represents terms and their descriptions.

TABLE 1

| Terms | Description |
|---|---|
| $s_{ij}$ | Target signature j on port i |
| $S_i$ | Rule set constituting $s_{ij}$ |
| $N_S^i$ | Number of signatures in $S_i$ |
| S | Finite set of rule sets $s_i$ |
| $N_S$ | Number of signatures in S |
| $r_S^i$ | Ratio of $N_S^i$ to $N_S$, where $\frac{N_S^i}{N_S}$ |
| $r_S$ | Finite set of $r_S^i$ |
| $T_P$ | learning time period for packet collection |
| $T_{TH}$ | Triggering threshold time for generating load balancing rule |
| $p_{ij}$ | Packet j having port number i |
| $P_i$ | Finite set of packets constituting $p_{ij}$ collected during $T_P$ |
| $N_P^i$ | Number of packets in $P_i$ |
| P | Finite set of packets constituting $P_i$ |
| $N_P$ | Number of packets in P |
| $r_P^i$ | Ratio of $N_P^i$ to $N_P$, where $\frac{N_P^i}{N_P}$ |
| $r_P$ | Finite set of $r_P^i$ |
| $T_S^i$ | Service time estimated for $P_i$ |
| $T_S$ | Finite set of estimated service time $T_S^i$ |
| $R_C$ | Load balancing rule for filtering packets on core C |
| R | Finite set of $R_C$ |
| PL | Set of n time-dominant ports |
| $\widetilde{PL}$ | Set of port numbers not belonging to PL |
| $N_{PL}^i$ | number of packets whose port number i belongs to PL |
| $N_{\widetilde{PL}}^j$ | number of packets whose port number j belongs to $\widetilde{PL}$ |
| $N_C$ | Number of cores included in multi-core NIDS |

The following table represents a pseudocode indicating a service time-aware dynamic load balancing algorithm.

TABLE 2

| Algorithm 1 service time-aware dynamic load balancing |
|---|
| 1: Procedure STEAL (S,P) |
| 2:    InitialLBRule(); |
| 3:    $r_s$= SigAnal(S); |
| 4:    while Trigger() returns TRUE? Do |
| 5:       $r_p$ =TrafficAnal(P); |
| 6:       PL = CorrAnal($r_s$,$r_p$); |
| 7:       R = RuleGen(PL); |
| 8:       RuleUpdate(R); |
| 9:    end while |
| 10: end procedure |

Whenever the load balancing rule is updated, the signature is analyzed (SigAnal(S)), and incoming traffic is analyzed (TrafficAnal(P)) as shown in Table 2 above in order to dynamically assign the load balancing rule for the nodes of the multi-core NIDS. S may refer, for example, to the overall signature collection, and P may refer, for example, to incoming packets to generate a new load balancing rule. P includes header and payload information of packets classified as per services.

The service as a reference for classifying packets may be determined by the port number because the same service typically uses the same port number. However, since a certain service may be offered using a port number different from a normal port number, whether the service is the same may be determined by analyzing the packet header and packet payload. However, since a change in the port number rarely arises, it is possible to match the service with the port number by periodically monitoring the service using the user defined port.

The load balancing method as per algorithm 1 above may include: (1) balancing traffic load as per the packet arrival rate (InitialLBRule( )); (2) analyzing an activated signature (SigAnal(S)); (3) generating a trigger (Trigger( ); (4) analyzing traffic (TrafficAnal(P)); (5) estimating an average DPI time of packets corresponding to a particular service (CorrAnal($r_s$, $r_p$)); (6) generating a new load balancing rule (RuleGen(PL)); (7) updating the generated new load balancing rule (RuleUpdate(R)); and (8) processing packets using the updated rule by the multi-core NIDS.

In operation (1), traffic load may be distributed by round robin scheduling. According to the present disclosure, the load balancing method may apply after signature analysis and traffic analysis are done, and in the initialization process, load balancing by round robin scheduling may thus be applied. Where a proper number of packets are captured, the load balancing rule may be updated as per signature analysis and traffic analysis.

For example, operation (1) corresponds to the initialization process. It may be operated by round robin scheduling even when no signature collection is present. However, when the load balancing rule is updated (RuleUpdate(R)) as per the rule generated (RuleGen(PL)) after the signature analysis (SigAnal(S)) has been done, load balancing is performed as per the updated load balancing rule in the intrusion detection system.

In operation (2), the signature used in the intrusion detection system is analyzed by the signature analyzing component 380 included in the load balancing rule generating module 370.

Typically, it is a rare case that the signature collection varies under the circumstance that the intrusion detection system is running. However, the signature collection may be varied and the varied signature collection may be reflected in real-time.

Typically, when a new malicious attack pattern is discovered, the signature collection is created in a regular expression that may detect the discovered attack pattern. This is why the signature collection rarely varies while the intrusion detection system works, and since the intrusion detection system typically keeps on running, it may be difficult to stop the intrusion detection system and reflect the varied signature collection unless there is a special occasion.

In operation (3), when a predetermined condition affecting the overall DPI time of the multi-core NIDS is met or a predetermined time elapses, a trigger is generated to change the load balancing rule.

In operation (4), the traffic analyzing component 375 that receives the metadata generated by the traffic analysis of the event analyzing module 340 analyzes the traffic for each port.

Since the collection of signatures is not varied while the multi-core NIDS operates in operation (2), SigAnal(S) is performed only one time until the operation of the multi-core NIDS is terminated. However, the traffic analysis (TrafficAnal(P)) operation (4) is performed at predetermined periods or when a preset condition is met. In operation (6), the load balancing rule may periodically be varied depending on the result of traffic analysis.

The signature analysis operation (2) may calculate the number of signatures present per service and estimate the operation time for a particular service by the signatures.

Since the operation time may differ per signature, but it is not easy to calculate the individual operation times of the signatures represented in the regular expression, an average DPI time of the signatures for packets of a particular service may easily be calculated using only the number of signatures and the average operation time of all the signatures instead of using to estimate the average DPI time considering the operation time of the individual signatures. The average operation time of all the signatures may be reflected as a weight in estimating the average DPI time.

However, the operation time for all the signatures may statistically be calculated later and may be used as the operation time of each signature. Since the operation time for all the signatures is directly calculated, the complexity of calculation is increased, and a separate resource is needed for calculating the operation time of all the signatures. It may be not only difficult, but also undesirable in light of the system structure to statistically calculate the operation time of the individual signatures while the intrusion detection system detects an intrusion. This is why the intrusion detection algorithm that should work rapidly has difficulty in simultaneously performing an algorithm that analyzes the operation time of signatures requiring excessive system resources.

Hence, a separate analysis task is required that calculates the statistics of the operation time necessary for comparing the signatures with the packet. The use of the operation time of the individual signatures statistically calculated enables more exact estimation of the average DPI time per service, allowing for an increased distribution efficiency for the load balancing apparatus. However, since new attack patterns attempting an malicious intrusion are discovered every day, and new signatures should also be generated to respond to such new attack patterns, the statistics for the operation time of signatures may periodically be updated.

The traffic analysis operation (4) may also calculate the number of packets per service and estimate the operation time for a particular service by the traffic, which is similar to the signature analysis. Like in the case of signatures, the operation time for a certain service may differ per type of packet, but calculation of the operation time of individual packets is not easy. However, the operation time for the individual packets may statistically be calculated later, and a weight for the operation time for each packet may be calculated. The distribution efficiency of the load balancing apparatus may be increased by analyzing the packets, with the calculated weight reflected.

Operation (5) is an operation that estimates an average DPI time per service using the result of analysis of signatures and traffic.

In operation (5), the DPI time as per service is estimated (CorrAnal($r_s$, $r_p$)) by reflecting the weight to the result of analysis of the signatures and the result of analysis of the traffic.

In operation (6), a load balancing rule is generated (RuleGen(PL)) based on the average DPI time estimated in operation (5).

In operation (7), the generated new load balancing rule is updated (RuleUpdate(R)), and in operation (8), the load-balanced packets are processed using the load balancing rule updated in operation (7).

Figure 4:
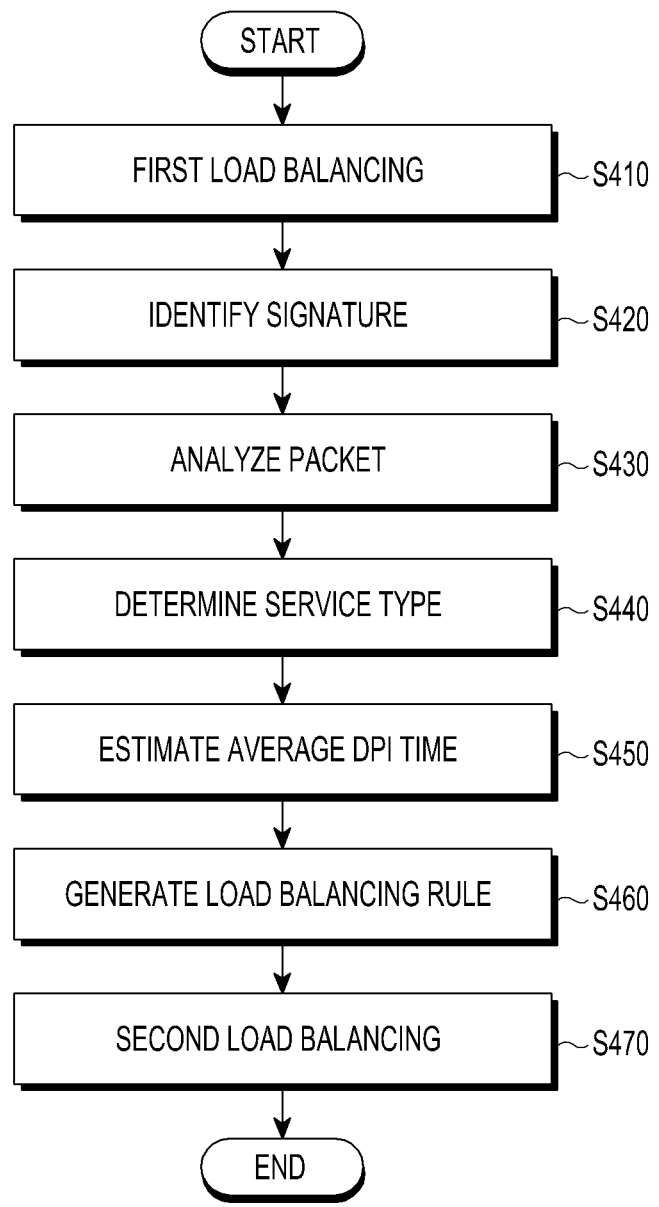
FIG. 4 a flowchart illustrating an example procedure of a load balancing method in an intrusion detection system according to an example embodiment of the present disclosure.

FIG. 4 is a flowchart illustrating an example procedure of a load balancing method in a load balancing apparatus according to an example embodiment of the present disclosure.

According to the present disclosure, a load balancing method by multiple cores in a multi-core-based load balancing apparatus comparing arriving packets with a signature may be implemented to include at least some of the following operations.

The load balancing apparatus may first load-balance first packets on the multiple cores according to the arrival rate of the first packets arriving during a first period (S410). Here, the arriving packets may refer, for example, to the packets come in the load balancing apparatus.

The load balancing apparatus may identify signatures that are subject to comparison (S420).

The load balancing apparatus may identify the ratio of the number of per-service signatures to the total number of the signatures in operation S420.

The load balancing apparatus may analyze the first packets (S430).

The load balancing apparatus may analyze the ratio of the number of per-service packets to the total number of the first packets in operation S430.

The load balancing apparatus may determine at least one service type of the first packets (S440).

The load balancing apparatus may determine the at least one service type by identifying the header of the first packets in operation S440. At this time, unless the at least one service type may be determined by identifying the header of the first packets, the load balancing apparatus may compare at least one of the signatures for comparison with the payload of the first packets to determine the at least one service type.

Typically, the service type of a packet may be determined by identifying the header of the packet because the packet header has a typical character string by which the service type can be identified. In some application services, however, the packet header may lack such a typical character string that allows for identification of the services, or even if any, it may be difficult to distinguish from the character string contained in the packet header of other application services. The signatures used in the intrusion detection system may identify not only the character string pattern contained in the packet header but also the character string pattern contained in the packet payload. The service type of packets may be identified using the characteristics of signature that the character string pattern contained in the packet payload may be identified.

The signature used in the load balancing apparatus according to the present disclosure is one for detecting a malicious packet intrusion. That is, the signature is one for identifying a character string having a malicious attack pattern but not for identifying the service type of packet. Some of all the signatures may determine the service type of packet by inspecting the packet payload. The service type may be determined using the packet header, or unless the service type can be determined using the packet header, the service type may be determined by comparing the packet payload with the signature.

The load balancing apparatus may estimate the average DPI time of the packets corresponding to the at least one service type determined (S450).

The load balancing apparatus may identify the ratio of the number of per-service signatures to the total number of the signatures and analyze the ratio of the number of per-service packets to the total number of the first packets. In operation S450, the load balancing apparatus may apply weights to the calculated ratio of the number of signatures and the calculated ratio of the number of packets and sum up them, estimating the average DPI time.

In operation S450, the load balancing apparatus may sort the average DPI time in descending order and generate a first service list and second service list including the at least one service type based on the sorted average DPI time. The first service list may include service types having an average DPI time greater than or equal to a first level, and the second service list may include service types having an average DPI time less than the first level.

The load balancing apparatus may generate a load balancing rule using the estimated average DPI time (S460).

In operation S460, the load balancing apparatus may generate the load balancing rule by which packets for the service types included in the first service list are assigned to be processed by some of the multiple cores, and packets for the service types included in the second service type are assigned to be processed by the rest of the multiple cores.

The load balancing apparatus may second load-balance second packets arriving during a second period on the multiple cores using the generated load balancing rule (S470).

The load balancing apparatus second load-balances the second packets on the multiple cores using the generated load balancing rule based on the result of analysis of the first packets.

According to the present disclosure, the load balancing method may further include at least some of the following operations.

The load balancing apparatus may analyze the second packets.

The load balancing apparatus may further include monitoring whether the traffic of arriving packets exceeds a predetermined level or whether a predetermined time elapses after the second load balancing has been performed prior to the analysis of the second packets.

The load balancing apparatus may analyze the ratio of the number of per-service packets to the total number of the second packets. Specifically, the load balancing apparatus may determine at least one service type of the second packets when analyzing the ratio of the number of packets.

The load balancing apparatus may determine the at least one service type by identifying the header of the second packets. At this time, unless the at least one service type may be determined by identifying the header of the second packets, the load balancing apparatus may compare at least one of the signatures for comparison with the payload of the second packets to determine the at least one service type.

The load balancing apparatus may estimate the average DPI time of the second packets corresponding to the at least one service type determined.

The load balancing apparatus may identify the ratio of the number of per-service signatures to the total number of the signatures and analyze the ratio of the number of per-service packets to the total number of the second packets. The load balancing apparatus may apply weights to the calculated ratio of the number of signatures and the calculated ratio of the number of packets and sum up them, estimating the average DPI time.

The load balancing apparatus may sort the average DPI time in descending order and generate a first service list and second service list including the at least one service type based on the sorted average DPI time. The first service list may include service types having an average DPI time not smaller than a first level, and the second service list may include service types having an average DPI time smaller than the first level.

The load balancing apparatus may generate a load balancing rule using the estimated average DPI time.

The load balancing rule may assign packets for the service types included in the first service list to be processed by some of the multiple cores and packets for the service types included in the second service type to be processed by the rest of the multiple cores.

The load balancing apparatus may third load-balance third packets arriving during a third period on the multiple cores using the generated load balancing rule.

The load balancing apparatus may generate the load balancing rule by which packets for the service types included in the first service list are assigned to be processed by some of the multiple cores, and packets for the service types included in the second service type are assigned to be processed by the rest of the multiple cores(S460).

The following table represents a pseudocode indicating a SigAnal(S) algorithm.

TABLE 3

| Algorithm 2 signature analysis based on port number i |
| --- |
| 1: procedure SigAnal (S,P) |
| 2: $N_s^i = 0$, $N_s = 0$; |
| 3: for $S_i$ in S do |
| 4: for $s_{ij}$ in $S_i$ do |
| 5: $N_s^i$++; |
| 6: end for |
| 7: $N_s = N_s + N_s^i$; |
| 8: end for |
| 9: for $S_i$ in S do |
| 10: $r_s^i = N_s^i / N_s$ |
| 11: $r_s \leftarrow r_s^i$ |
| 12: end for |
| 13: return $r_s$; |
| 14: end procedure |

Algorithm 2 represents an embodiment of a method for analyzing signatures in operation (2) above. This is merely an example and the present disclosure is not limited to algorithm 2.

Algorithm 2 suggests a simple form of signature analysis method. Typically, the operation time differs per signature. However, since the operation time of a signature is influenced by the data format of packets or traffic that is to be compared, as well as the signature, it is theoretically difficult to estimate the operation time of individual signatures.

However, if signature analysis on a large volume of traffic accrued during a predetermined period is performed, information about the operation time consumed to compare each signature with the packet may be calculated in the future, and the calculated operation time information may be utilized for signature analysis. The operation time calculated for a certain packet might not be useful statistical data for other packets, and no statistical data may be obtained for a new signature. To address such issue, an average operation time may be calculated for a particular service and may be utilized as the operation time for a new signature, and a proper operation time may be determined according to similarity by analyzing the syntax of the signature.

In algorithm 2, for the signature collection S, the number ($N_s^i$) of signatures for a particular service is calculated, and they are summed up, calculating the total number ($N_s$) of the signatures. It was experimentally verified that an excellent load balancing efficiency was achieved only by calculating the number of signatures.

In algorithm 2, the service types were divided by port number i. This is why a service type tends to be distinguished from another by the port number. However, the service types are not necessarily distinguished by the port number. For example, the traffic analyzing component may determine the service type for the corresponding packet by analyzing the syntax of the packet header and packet payload contained in the traffic. It has been described above that the signature used in the intrusion detection system may be used when analyzing the syntax of the packet header and packet payload.

In order to extract the characteristics of the signature collection ($S_i$) for a particular service that may consume a relatively long DPI time during the comparison with the packets, the ratio of $N_s^i$ to $$N_S\left(=\frac{N_S^i}{N_S}\right), \text{i.e., } r_S^i,$$

is calculated. That is, where $r_s^{80}$ is larger than $r_s^{23}$, the packet having port number 80 is compared with more signatures, rendering the operation time longer, and the packet having port number 23 has a relatively shorter operation time (typically, port number 80 is used for web service, and port number 23 is used for telnet service)

The following table represents a pseudocode indicating an event triggering algorithm.

TABLE 4

Event triggering for dynamically generating rule based on algorithm 3 $T_p$

```
1:  Procedure Trigger ()
2:      updateT_p;
3:      ifT_p<T_TH then
4:          return FALSE;
5:      else
6:          T_p= 0;
7:          return TRUE;
8:      end if
9:  end procedure
```

When a sufficient amount of packets to affect the overall DPI time of multi-core NIDS are monitored or a predetermined time elapses after the load balancing rule has been updated, an event for dynamic rule setting may be triggered (Trigger( ))(refer to algorithms 1 and 3). For example, when $T_p$ (learning time for a set of packets) is larger than $T_{TH}$ (threshold time for triggering, a trigger for generating a load balancing rule is generated. Further, upon identifying a sufficient amount of packets exceeding the available processing capability of one of the nodes of the multi-core NIDS, the trigger may be operated.

The following table represents a pseudocode indicating a traffic analyzing algorithm for each port number i.

TABLE 5

Algorithm 4 traffic analyzing algorithm for each port number i

```
1:  Procedure TrafficAnal (P)
2:      N_p^i= 0, N_p= 0;
3:      forP_i in P do
4:          forp_ij in P_i do
5:              N_p^i++;
6:          end for
7:          N_p= N_p+ N_p^i;
8:      end for
9:      forP_i in P do
10:         r_p^i= N_p^i/ N_p
11:         r_p←r_p^i
12:     end for
13:     return r_p;
14: end procedure
```

If the number of packets that are compared with rule sets, the DPI time of the multi-core NIDS is also prolonged. Like in algorithm 2, the ratio of $N_p^i$ to $$N_P\left(=\frac{N_P^i}{N_P}\right), \text{i.e., } r_P^i,$$

is calculated (TrafficAnal(P)) by analyzing the metadata of packets that each core inspects.

The following table represents a pseudocode of an algorithm estimating DPI time.

TABLE 6

Algorithm 5 estimating DPI time

```
1:  Procedure CorrAnal (S,P)
2:      for each port number i do
3:          T_s^i= r_s^i*w_s + r_p^i*w_p
4:          T_s←T_s^i;
5:      end for
6:      sort T_s in the decreasing order
7:      compose PL with n number of ports with the higher order;
8:      return PL ;
9:  end procedure
```

Algorithm 5 indicates a method for estimating a DPI time for packets having port number i. As per algorithm 5, if the number of packets to be compared with multiple signatures for a given signature collection increases, the DPI time of the multi-core NIDS is also increased. In other words, since the DPI time of packet is influenced by the relationship between packets and signatures, the influence by traffic and signatures should be taken into account to estimate the average DPI time. The average DPI time ($T_s^i$) estimated per service considers the influence by both the per-service signature ratio $r_s^i$ and the per-service packet ratio $r_p^i$. Further, the influence on the DPI time by packets differs from the influence on the DPI time by signatures. Thus, given the weights ($w_s$, $w_p$, where, $w_s+w_p=1$) for $r_s^i$ and $r_p^i$, the DPI time $T_s^i$ estimated per service may be calculated.

The calculated $T_s^i$ is inputted to $T_g$, and $T_g$ is sorted in descending order, so that n dominant ports (service types) may be chosen in the order in which the calculated $T_s^i$ is larger, and information about the n ports may be selected to constitute PL. Information about the remaining ports that do not belong to the set of dominant ports may constitute $\overline{PL}$.

The following table represents a pseudocode indicating an algorithm for generating a load balancing rule for each core.

TABLE 7

Algorithm 6 generating load balancing rule for each core

1: procedure RuleGen (PL)
2:  c = 0; count = 1;
3:  
$$temp = \frac{\sum_{j}^{PL} T_S^j}{T_S};$$

4:  while$\left(temp > \left(\frac{100}{N_C} \times count\right)\right)$do
5:      count++;
6:  end while
7:  c=$N_C$-count;
8:  $C_{TH}$ = c;
9:  while(c--)> 0 do
10:     for i ∈ PL do
11:         set $R_C$ to accept ($N_{PL}^i/C_{TH}$) packets;
12:     end for
13: R ←$R_C$;
14: end while
15: c = $C_{TH}$;
16: $C_{TH}$ = $N_C$-$C_{TH}$;
17:while(c++)<$N_C$ do
18:     for j ∈ $\widehat{PL}$ do
19:         set $R_C$ to accept ($N_{PL}^j/C_{TH}$) packets;
20:     end for
21:     R ←$R_C$;
22: end while
23: retrun R ;
24: end procedure By referring to PL, a customized load balancing rule for each core, i.e., $R_c$ as shown in algorithm 6, is generated. Upon constituting $R_c$, one or more cores are assigned to filter the packets whose port number belongs to PL, and the remaining cores are assigned to filter the packets whose port number belongs to PL.

The following table represents a pseudocode indicating an algorithm for updating a generated rule and applying the same.

TABLE 8

Algorithm 7 generating load balancing rule for each core

1:  Procedure RuleUpdate (R)
2:      for each port Cdo
3:          update the customer filter with $R_C$;
4:          $T_s$←$T_s^i$;
5:      end for
6:  end procedure By first assigning the cores for packets belonging to the PL, packets consuming a longer DPI time may rapidly be processed, so that the DPI time of the multi-core NIDS may be reduced. As shown in Table 8, each node of the multi-core NIDS receives packets matching $R_c$ (RuleUpdate(R)) by assigning R to the multi-core NIDS.

FIGS. 5A, 5B, 5C and 5D are graphs illustrating capability comparisons between a load balancing method according to the present disclosure and a traffic processing method using a many-core Bro.

Figure 5A:
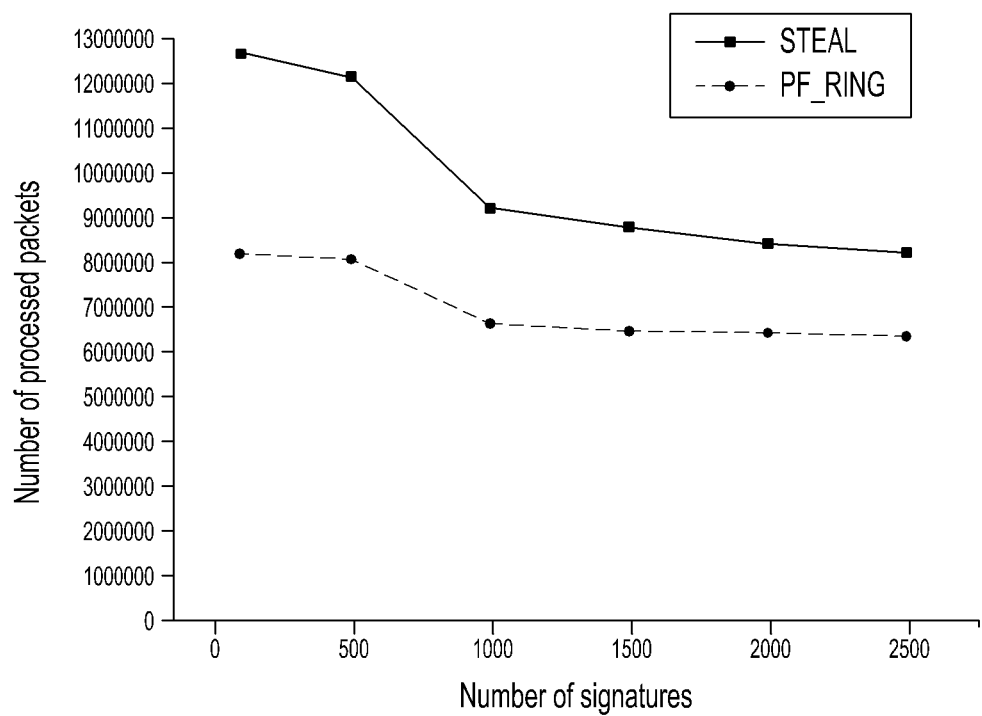
Figure 5B:
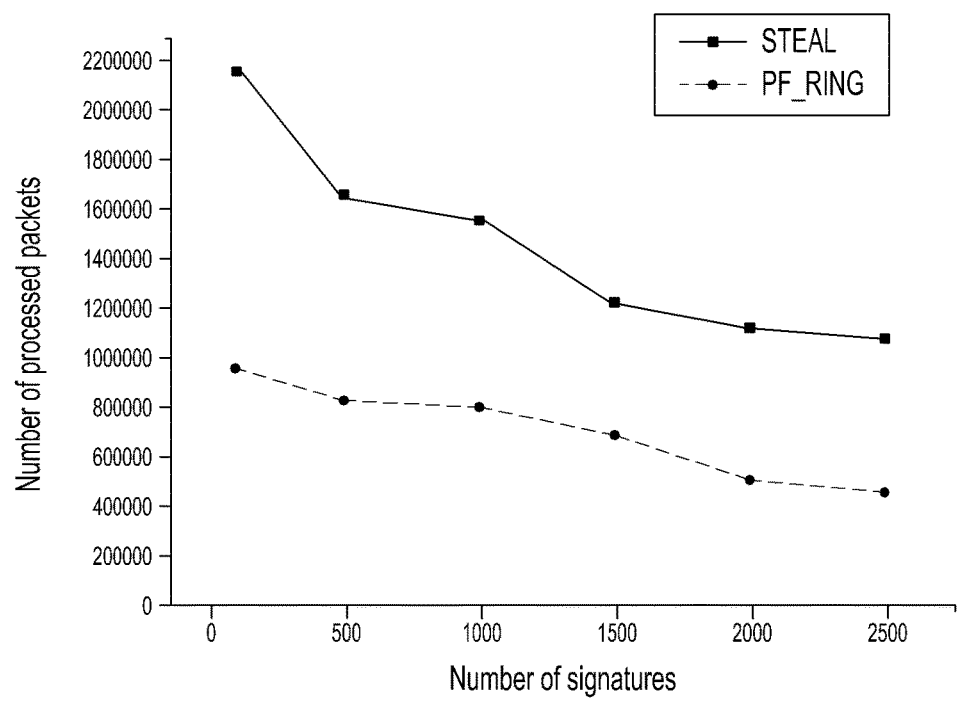
Figure 5C:
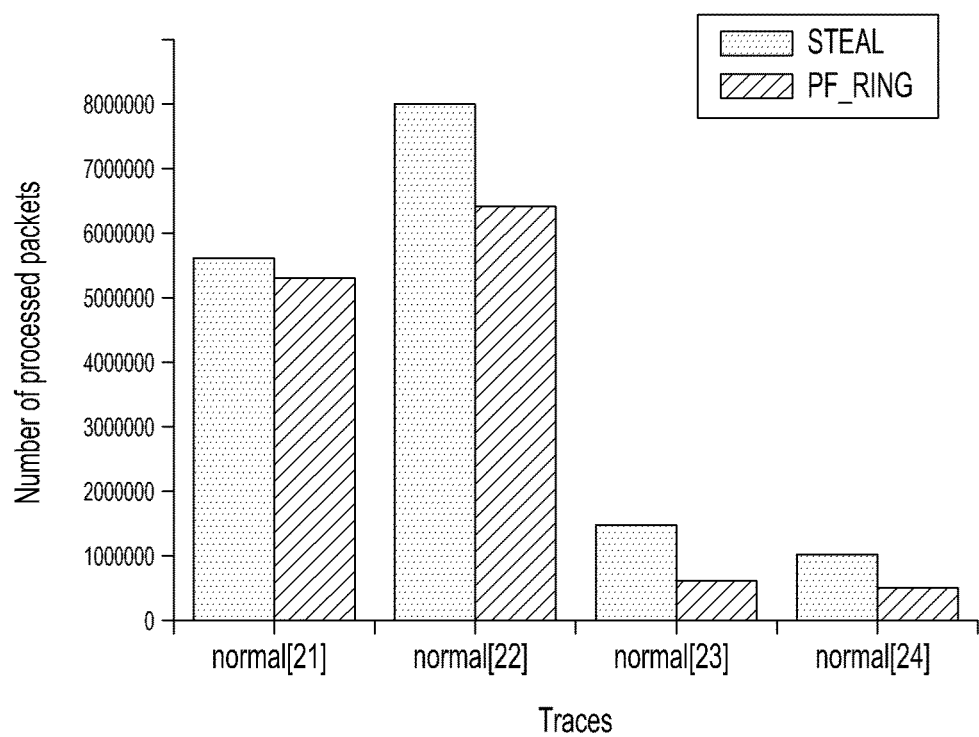
Figure 5D:
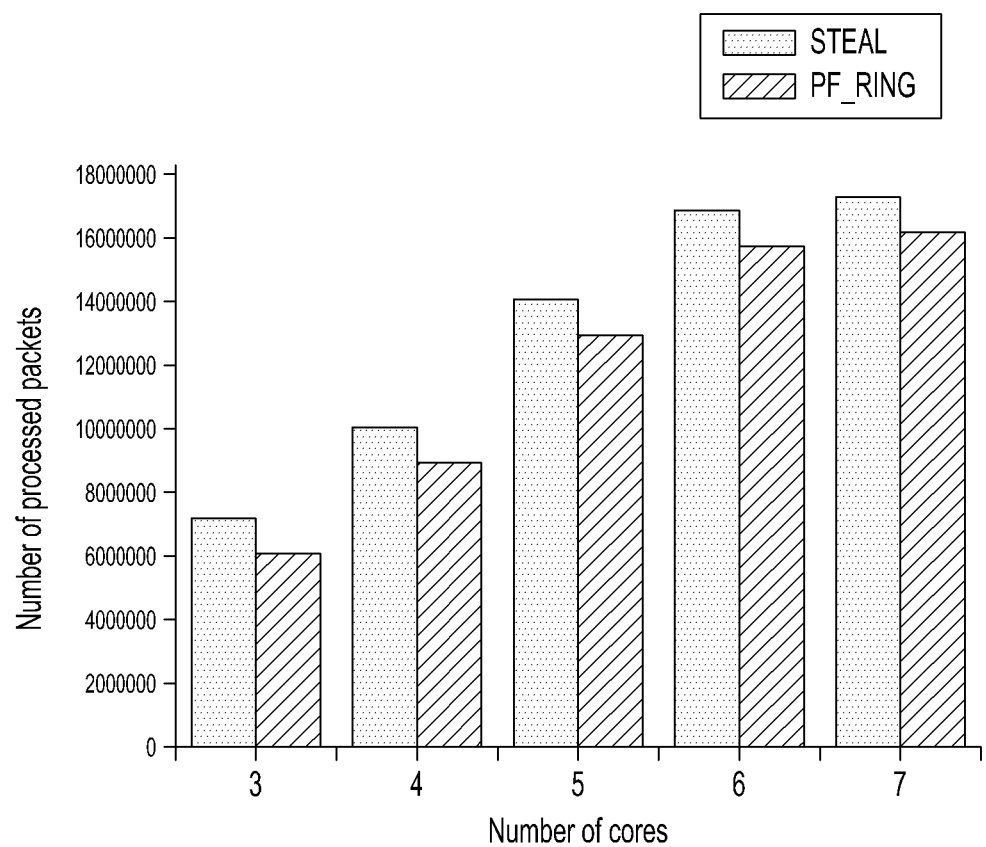

FIG. 5A is a graph illustrating a capability comparison between a STEAL method with a many-core Bro under normal traffic, FIG. 5B is a graph illustrating a capability comparison between a STEAL method and a many-core Bro under attack dominant traffic, FIG. 5C is a graph illustrating a capability comparison between a STEAL method and a many-core Bro depending on the number of signatures and traffic circumstances, and FIG. 5D is a graph illustrating a capability comparison between a STEAL method and a many-core Bro under normal traffic depending on the number of CPU cores.

Bro which is an open source program provides a module for arbitrarily customizing the load balancing rule and signatures for traffic analysis. Thus, the load balancing method according to the present disclosure may be easily combined with Bro. The load balancing method set forth in Bro 2.4.1 adopts a flow-based load balancing method that distributes incoming packets to each core by analyzing a bundle of information with four pairs of packets. Further, the PF_RING technique may be used as packet capturing plugin function by being combined with the many-core Bro to accelerate the performance of the dynamic flow-based load balancing scheme. The PF_RING technique is a program that provides a network socket having the packet capturing speed enhanced and provides a rapid packet capturing, filtering, and analyzing function.

The load balancing method according to the present disclosure as used in FIGS. 5A to 5D is a STEAL method that combines altogether the open source Bro NIDS (Bro 2.4.1) supporting multi-core NIDS operation, PF_RING technique, and the service time-aware load balancing technique according to the present disclosure. PF_RING denotes a combination of Bro and PF_RING and is denoted many-core Bro or PF_RING to be distinguished from STEAL.

Typically, since the capability of NIDS is influenced by various ambient circumstances, the environmental variables of STEAL, PF_RING, and Bro should be able to be varied depending on, e.g., the number of signatures, traffic circumstances, or the number of CPU cores.

In FIGS. 5A to 5D, comparison is made as to the capability of Bro combined with PF_RING between when STEAL applies and when STEAL does not apply depending on various conditions (number of signatures, traffic circumstances, and number of CPU cores).

As a mean value for when there is no packet dropping in the single-core NIDS from a result of empirical analysis, $T_{TE}$ (a triggering threshold time for generating a load balancing rule) has been set up.

For the experiments illustrated in FIGS. 5A to 5D, a linux machine was used that has a CPU clock 2.1 GHz 6-core processor (15 Mbyte L3 cache), a 32 GB main memory, a LAN card interface supporting 10 Gbps, and a kernel whose version is 3.19.0-25-generic. This is merely an example and the present disclosure is not limited thereto.

In order to grasp traffic processing capability under various environments, STEAL was compared in capability with the conventional Bro under the assumptions of typical search traffic (FIG. 5A) using normal packet traces, attack dominant search traffic (FIG. 5B) using attack packet traces, and large-volume traffic (FIG. 5C) under the maximum transmission rate.

In FIG. 5C, a large volume of traffic was generated using a TcpReplay, and a Snort signature was converted into a Bro signature to generate various signatures.

Under the given circumstance, the average number, processing rate, and packet dropping conditions of inspection packets were calculated.

It can be seen from FIG. 5A that STEAL shows a better performance than Bro even under the normal traffic circumstance. It was verified from FIG. 5B that STEAL showed a better performance under the attack dominant trace circumstance.

According to FIG. 5C, the number of signatures was changed, the number of packets processed as per the number of signatures was calculated, and comparison was made between STEAL and Bro. The capability of STEAL was further enhanced under the attack dominant circumstance than under the normal traffic circumstance.

In FIG. 5D, the number of cores was changed from three to eight to inspect the capability of the increased multi-core NIDS nodes, and the capability of the many-core Bro was measured. Under the assumption of normal traffic and 1000-count signature, the numbers of packets processed by STEAL and the many-core Bro are shown. As the number of cores increases, the number of packets that the many-core Bro may process increases, reducing the difference between STEAL and the many-core Bro.

Figure 6:
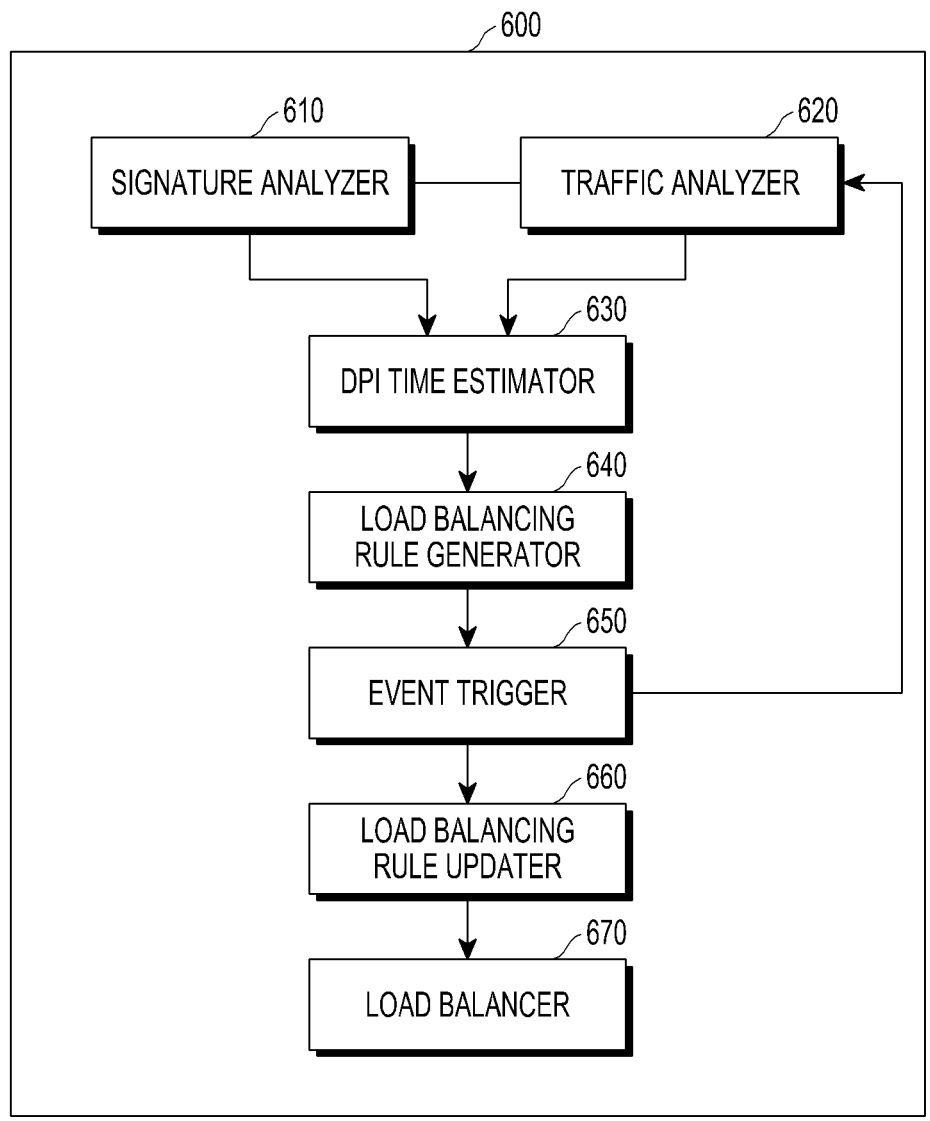
FIG. 6 is a block diagram illustrating an example configuration of a load balancing apparatus in an intrusion detection system according to an example embodiment of the present disclosure.

FIG. 6 is a block diagram illustrating an example configuration of a load balancing apparatus in an intrusion detection system according to an example embodiment of the present disclosure.

According to the present disclosure, a multi-core-based load balancing apparatus comparing arriving packets with a signature comprises a memory storing a program for providing a load balancing rule generating module and a processor running the program, wherein the processor runs the program to first load-balance first packets arriving during a first period on the multiple cores according to an arrival rate of the first packets, identify a signature for the comparison, analyze the first packets, determine at least one service type of the first packets, estimate a mean deep packet inspection (DPI) time corresponding to the determined at least one service type of the first packets, generate a load balancing rule using the estimated average DPI time, and second load-balance second packets arriving during a second period on the multiple cores using the generated load balancing rule.

According to the present disclosure, a multi-core-based load balancing apparatus 600 comparing arriving packets with a signature in an intrusion detection system may include at least one of a signature analyzer (e.g., including signature analyzing circuitry and/or program elements) 610, a traffic analyzer (e.g., including traffic analyzing circuitry and/or program elements) 620, a DPI time estimator (e.g., including time estimating circuitry and/or program elements) 630, a load balancing rule generator (e.g., including load balancing rule generating circuitry and/or program elements) 640, an event trigger (e.g., including event triggering circuitry and/or program elements) 650, a load balancing rule updater (e.g., including load balancing rule updating circuitry and/or program elements) 660, and a load balancer (e.g., including load balancing circuitry and/or program elements) 670.

A program performing the function of the signature analyzer 610, traffic analyzer 620, DPI time estimator 630, load balancing rule generator 640, event trigger 650, load balancing rule updater 660, and load balancer 670 may be stored in the memory 120, and the processor may run the program.

The signature analyzer 610 may analyze all signature collections and calculate the number of signatures for a particular service. The signature analyzer 610 may calculate a ratio of the number of per-service signatures to the total number of the signatures.

The traffic analyzer 620 analyzes captured packets. The traffic analyzer 620 may analyze a ratio of the number of per-service packets to the total number of the first packets. The traffic analyzer 620 may analyze the packet header or packet payload to determine the service type of packet.

The DPI time estimator 630 may estimate an average DPI time of packets corresponding to the one determined service type from the result of signature analysis and the result of traffic analysis.

The DPI time estimator 630 may apply, to the ratio ($r_s^i$) of the number of per-service signatures to the total number of signatures calculated by the signature analyzer 610 and the ratio ($r_p^i$) of the number of per-service packets to the total number of the first packets analyzed by the traffic analyzer 620, weights ($w_s$, $w_p$) and sum them up, estimating an average DPI time ($T_s^i$) of the packets corresponding to the one determined service type. The estimated average DPI time may be as follows.

$$T_s^i = r_s^i * w_s + r_p^i * w_p \qquad \text{[Equation 1]}$$

The DPI time estimator 630 may sort the average DPI time ($T_s^i$) in descending order and generate a first service list and second service list including the at least one service type based on the sorted average DPI time. The first service list may include service types having an average DPI time greater than or equal to a first level, and the second service list may include service types having an average DPI time less than the first level.

The load balancing rule generator 640 generates a load balancing rule using the estimated average DPI time.

The load balancing rule generator 640 may generate the load balancing rule by which packets for the service types included in the first service list are assigned to be processed by some of the multiple cores, and packets for the service types included in the second service type are assigned to be processed by the rest of the multiple cores.

The event trigger 650 may monitor whether the traffic of arriving packets exceeds a predetermined level or a predetermined time elapses after the first load balancing has been performed, and when the traffic of arriving packets exceeds the predetermined level or the predetermined time elapses, the event trigger 650 may generate a triggering event.

The load balancing rule updater 660 updates the generated load balancing rule, and the load balancer 670 performs load balancing using the updated load balancing rule.

The above-described operations may be realized by equipping a memory device retaining their corresponding codes in any component of an entity, function, access point (AP), server, or a terminal device in a communication system. That is, the controller in the entity, the function, the AP, the server, or the terminal device may execute the above-described operations by reading and executing the program codes stored in the memory device by a processor or central processing unit (CPU).

As described herein, various components or modules in the entity, function, AP, server, or terminal device may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

As is apparent from the foregoing description, an uneven operation distribution to the nodes of a multi-core NIDS in the high-speed intrusion detection method may influence the available processing capability of the multi-core NIDS, increasing the inefficiency of the IDS. However, the load balancing method, according to the present disclosure, may dynamically distribute large traffic among the nodes of the multi-core NIDS based on the packet service time, thereby enhancing the efficiency of the NIDS. According to the present disclosure, the operation distribution to the nodes of the multi-core NIDS may be relatively evenly adjusted, allowing the multi-core NIDS to operate at high speed.

The intrusion detection capability is influenced by an unbalanced operation distribution among the nodes of the multi-core NIDS. Thus, as compared with typical packet arrival rate-based load balancing algorithms, the STEAL method according to the present disclosure may increase the number of receive packets in the multi-core NIDS while decreasing dropping packets.

From experimental results, a multi-core NIDS combined with STEAL may implement a high-speed intrusion detection system even where a large amount of signature collections exist under attack dominant traffic. According to the present disclosure, the load balancing method may be subject to easy adjustment even with changes in the number of the cores in the multi-core NIDS, allowing it to be adaptively applied to various environments.

Although various example embodiments of the present disclosure have been described above, various changes may be made thereto without departing from the scope of the present disclosure. Thus, the scope of the present disclosure should not be limited to the above-described example embodiments, and should rather be defined by the following claims and equivalents thereof.

What is claimed is:

1. A method of load balancing multiple cores in an electronic device, the method comprising:
   performing first load-balancing of first packets arriving during a first period on each of a plurality of cores of at least one processor of the electronic device based on an arrival rate of the first packets using a first load balancing rule;
   identifying one or more signatures representing an attack packet to compare with the first packets;
   analyzing the first packets;
   identifying at least one service type of the first packets;
   obtaining, based on the identified one or more signatures and the arrival rate of the first packets, at least one average deep packet inspection (DPI) time corresponding to the at least one service type of the first packets;
   setting a second load balancing rule different from the first load balancing rule corresponding to each of the plurality of cores based on the obtained at least one average DPI time; and
   performing second load-balancing of second packets arriving during a second period on each of the plurality of cores using the second load balancing rule,
   wherein the performing second load-balancing of the second packets comprises:
   distributing the second packets on each of the plurality of cores to compare with the one or more signatures according to the available processing capabilities of each of the plurality of cores based on the at least one average deep packet inspection (DPI) time, and wherein the at least one average deep packet inspection (DPI) time is set based on a ratio of a number of per-service signatures to a total number of the one or more signatures.

2. The method of claim 1, further comprising:
   analyzing the second packets;
   identifying at least one service type of the second packets;
   obtaining at least one average DPI time corresponding to the identified at least one service type of the second packets;
   generating a third load balancing rule using the estimated at least one average DPI time of the second packets; and
   performing third load-balancing of third packets arriving during a third period on each of the plurality of cores using the third load balancing rule.

3. The method of claim 2, further comprising:
   identifying whether a number of the second packets exceeds a predetermined number or whether a predetermined time elapses after the second load balancing is performed.

4. The method of claim 1, wherein analyzing the first packets comprises:
   analyzing a ratio of a number of per-service packets to a total number of the first packets.

5. The method of claim 1, wherein identifying the at least one service type of the first packets comprises at least one of:
   identifying the at least one service type by identifying a header of the first packets; or
   identifying the at least one service type by comparing the one or more signatures with a payload of the first packets when the at least one service type cannot be identified by identifying the header of the first packets.

6. The method of claim 1, wherein obtaining the at least one average DPI time corresponding to the at least one service type comprises:
   sorting the at least one average DPI time in descending order; and
   setting a first service list and a second service list including the at least one service type based on the sorted at least one average DPI time,
   wherein the first service list includes a service type having an average DPI time greater than or equal to a first level, and
   wherein the second service list includes a service type having an average DPI time less than the first level.

7. The method of claim 1,
   wherein the second load balancing rule includes assigning packets for the service type included in the first service list to be processed by some of the plurality of cores and assigning packets for the service type included in the second service list to be processed by the rest of the plurality of cores.

8. The method of claim 1,
   wherein the at least one average DPI time is obtained based on a sum of values obtained by applying a first weight and a second weight respectively to the ratio of the number of per-service signatures to the total number of the one or more signatures and a ratio of a number of per-service packets to a total number of the first packets.

9. An electronic device comprising:
   a memory storing a program for providing a load balancing rule generating module; and
   at least one processor configured to execute the program, wherein the program, when executed by the processor causes the at least one processor to at least:
   perform first load-balancing of first packets arriving during a first period on each of a plurality of cores of at least one processor of the electronic device based on an arrival rate of the first packets using a first load balancing rule,
   identify the one or more signatures representing an attack packet to compare with the first packets,
   analyze the first packets,
   identify at least one service type of the first packets, obtain, based on the identified one or more signatures and the arrival rate of the first packets, at least one average deep packet inspection (DPI) time corresponding to the at least one service type of the first packets, set a second load balancing rule different from the first load balancing rule corresponding to each of the plurality of cores based on the obtained average DPI time, and perform second load-balancing of second packets arriving during a second period on each of the plurality of cores using the second load balancing rule, wherein the performing second load-balancing of the second packets comprises:

distributing the second packets on each of the plurality of cores to compare with the one or more signatures according to the available processing capabilities of each of the plurality of cores based on the at least one average deep packet inspection (DPI) time, and wherein the at least one average deep packet inspection (DPI) time is set based on a ratio of a number of per-service signatures to a total number of the one or more signatures.

10. The load balancing apparatus of claim 9, wherein the program, when executed by the processor causes the processor to analyze a ratio of a number of per-service packets to a total number of the first packets.

11. The load balancing apparatus of claim 9, wherein the at least one average DPI time is obtained based on a sum of values obtained by applying a first weight and a second weight respectively to the ratio of the number of per-service signatures to the total number of the one or more signatures and a ratio of a number of per-service packets to a total number of the first packets.

12. The load balancing apparatus of claim 9, wherein the program, when executed by the processor causes the processor to:

analyze the second packets, identify at least one service type of the second packets, obtain at least one average DPI time corresponding to the identified at least one service type of the second packets, set a third load balancing rule using the at least one average DPI time of the second packets, and perform third load-balancing of third packets arriving during a third period on each of the plurality of cores using the third load balancing rule.

13. The load balancing apparatus of claim 9, wherein the program, when executed by the processor causes the processor to identify the at least one service type by identifying a header of the first packets.

14. The load balancing apparatus of claim 13, wherein the program when executed by the processor causes the processor to identify the at least one service type by comparing the one or more signatures with a payload of the first packets.

15. The load balancing apparatus of claim 9, wherein the program, when executed by the processor causes the processor to at least:

sort the at least one average DPI time in descending order, and set a first service list and a second service list including the at least one service type based on the sorted at least one average DPI time, wherein the first service list includes a service type having an average DPI time greater than or equal to a first level, and the second service list includes a service type having an average DPI time less than the first level.

16. The load balancing apparatus of claim 9, wherein the second load balancing rule includes assigning packets for the service type included in the first service list to be processed by some of the plurality of cores, and assigning packets for the service type included in the second service list to be processed by the rest of the plurality of cores.

* * * * *